US010890181B2

(12) United States Patent
Rosenbarger

(10) Patent No.: US 10,890,181 B2
(45) Date of Patent: Jan. 12, 2021

(54) ENHANCING FLUID FLOW IN GEROTOR SYSTEMS

(71) Applicant: Boundary Lubrication Systems, L.L.C., Royse City, TX (US)

(72) Inventor: Travis Rosenbarger, Royse City, TX (US)

(73) Assignee: Boundary Lubrication Systems, L.L.C., Royse City, TX (US)

(*) Notice: Subject to any disclaimer, the term of this patent is extended or adjusted under 35 U.S.C. 154(b) by 0 days.

(21) Appl. No.: 16/893,916

(22) Filed: Jun. 5, 2020

(65) Prior Publication Data

US 2020/0300243 A1 Sep. 24, 2020

Related U.S. Application Data

(60) Provisional application No. 62/860,877, filed on Jun. 13, 2019.

(51) Int. Cl.
*F04C 15/06* (2006.01)
*F04C 2/10* (2006.01)
*F04C 15/00* (2006.01)
*F04C 2/08* (2006.01)

(52) U.S. Cl.
CPC .......... *F04C 15/06* (2013.01); *F04C 2/084* (2013.01); *F04C 2/088* (2013.01); *F04C 2/10* (2013.01); *F04C 2250/10* (2013.01); *F04C 2250/20* (2013.01)

(58) Field of Classification Search
CPC ........ F04C 15/06; F04C 2/10; F04C 15/0088; F04C 2220/00; F04C 11/001; F04C 15/0042; F16H 55/08; F05B 2210/40

USPC ................ 418/61.3, 132, 133, 183
See application file for complete search history.

(56) References Cited

U.S. PATENT DOCUMENTS

| 2,790,394 A | * | 4/1957 | Mori ...................... F04C 2/113 418/1 |
| 3,866,480 A | * | 2/1975 | Elliston ................... B06B 1/167 74/87 |
| 4,836,760 A | * | 6/1989 | MacLeod ............... F04C 2/102 418/166 |
| 5,011,520 A | * | 4/1991 | Carr ...................... B01D 47/08 261/116 |
| 7,008,200 B2 | | 3/2006 | Holtzapple et al. |
| 7,328,591 B2 | | 2/2008 | Holtzapple et al. |

(Continued)

OTHER PUBLICATIONS

Photo of prior art gerotor; sold in the United States as early as 1991, 1 pg.

*Primary Examiner* — Mary Davis
*Assistant Examiner* — Paul W Thiede

(57) ABSTRACT

In a general aspect, fluid flow in a gerotor system is enhanced. In some cases, a gerotor apparatus includes inner and outer gears. The outer gear includes inward-facing teeth and an inner surface that defines an inner profile of the outer gear. The inner gear includes outward-facing teeth and an outer surface that defines an outer profile of the inner gear. The inner gear and the outer gear reside in contact such that the inner profile of the outer gear seals against the outer profile of the inner gear at multiple distinct points. One or more cutouts are defined by the inner surface of the outer gear between a neighboring pair of the inward-facing teeth, by the outer surface of the inner gear between a neighboring pair of the outward-facing teeth, or both.

10 Claims, 13 Drawing Sheets

(56) References Cited

U.S. PATENT DOCUMENTS

| | | | |
|---|---|---|---|
| 7,695,260 B2 | 4/2010 | Holtzapple et al. | |
| 7,708,865 B2 | 5/2010 | Holtzapple et al. | |
| 8,022,586 B2 | 9/2011 | Holtzapple et al. | |
| 8,753,099 B2 | 6/2014 | Holtzapple et al. | |
| 9,429,069 B2 | 8/2016 | Price et al. | |
| 2003/0215345 A1 | 11/2003 | Holtzapple et al. | |
| 2004/0052670 A1* | 3/2004 | Dong | F04C 11/001 418/61.3 |
| 2005/0063851 A1* | 3/2005 | Phillips | F04C 15/0019 418/61.3 |
| 2008/0026855 A1 | 1/2008 | Holtzapple et al. | |
| 2008/0253901 A1 | 10/2008 | Holtzapple et al. | |
| 2010/0213786 A1 | 8/2010 | Holtzapple et al. | |
| 2013/0192192 A1 | 8/2013 | Price et al. | |
| 2015/0211788 A1 | 7/2015 | Holtzapple | |
| 2015/0267702 A1 | 9/2015 | Holtzapple et al. | |
| 2017/0198612 A1* | 7/2017 | Noguchi | F01L 1/047 |
| 2017/0321698 A1 | 11/2017 | Holtzapple et al. | |

* cited by examiner

ENHANCING FLUID FLOW IN GEROTOR SYSTEMS

CROSS-REFERENCE TO RELATED APPLICATIONS

This application claims priority to U.S. Provisional Application No. 62/860,877, filed Jun. 13, 2019 and entitled "Gerotor System and Method of Use."

BACKGROUND

The following description relates to enhancing fluid flow in gerotor systems.

Gerotors can provide compact, robust solutions for fluid circulation in a wide variety of applications, such as automatic transmissions, fuel pumps, and compressors. In a typical gerotor, a rotating gear configuration cyclically varies an internal volume to produce continuous fluid intake and fluid discharge actions, which produces a volumetric flow of fluid.

DETAILED DESCRIPTION

Figure 1:
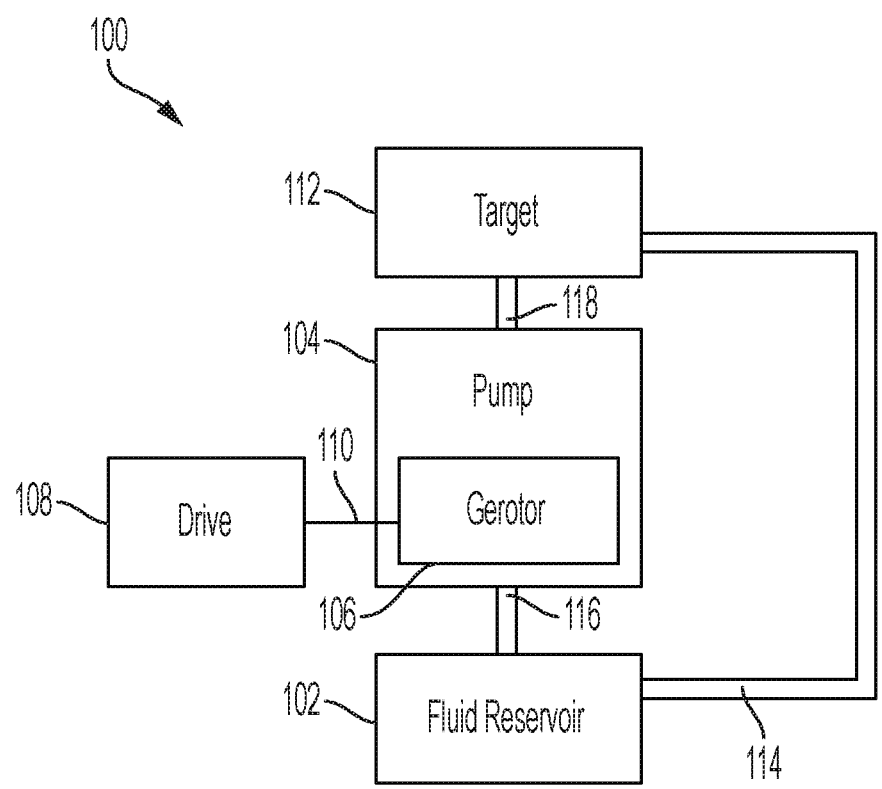
FIG. 1 is a block diagram of an example fluid circulation system.

One or more gears of a gerotor apparatus may include features (e.g., cutouts, ports, etc.) that enhance the flow of fluid through the gerotor apparatus during its operation. Such enhancements in fluid flow can improve operation of the gerotor apparatus. The gerotor apparatus can drive the fluid to a target device, and in some cases, the improved operation of the gerotor apparatus may improve operation of the target device as well. For example, the enhanced flow in the gerotor apparatus may improve the transfer of heat in a target device, improve the consistency of boundary lubrication layers in a target device, etc.

In some implementations, a gerotor apparatus includes an outer gear and an inner gear. The outer gear includes inward-facing teeth and an inner surface that defines an inner profile of the outer gear. The inner profile of the outer gear includes respective profiles of the inward-facing teeth. The inner gear reside within the outer gear. The inner gear includes outward-facing teeth and an outer surface that defines an outer profile of the inner gear. The outer profile of the inner gear includes respective profiles of the outward-facing teeth. The inner gear and the outer gear reside in contact such that the inner profile of the outer gear seals against the outer profile of the inner gear at multiple distinct points. One or more flow-enhancing features are defined by the inner gear, by the outer gear, or both. For example, a cutout may be defined by the inner surface of the outer gear between a neighboring pair of the inward-facing teeth, by the outer surface of the inner gear between a neighboring pair of the outward-facing teeth, or both. The gerotor apparatus may include additional components and features (e.g., additional gears, a housing, etc.).

In some implementations, the methods and apparatus described here can provide technical advantages and improvements. For example, the techniques described here may improve the flow rate and the volumetric efficiency of gerotor systems. In some instances, the methods and apparatus described here can also improve the capacity and other pumping performance aspects of gerotor systems, especially when operating at high rotational speeds (e.g., greater than 10,000 RPM, or another high rotational speed). For example, flow-enhancing features of the gerotor apparatus may reduce cavitation events, trapped gas within the working fluid, and possibly other types of events that could impair operation. In certain implementations, the methods and apparatus described here can improve dosing or flow accuracy and reduce damage to the gerotors and associated equipment. In some instances, the methods and apparatus described here can further reduce irregularities, such as noise and vibration, during operation. In some cases, a combination of these and potentially other advantages and improvements may be obtained. In some instances, such flow enhancements and improvements may be implemented in another type of apparatus, for example, in an external gear pump or an internal gear pump.

FIG. 1 is a schematic diagram of an example fluid circulation system 100. As shown in FIG. 1, the example system 100 includes a fluid reservoir 102, a pump 104, a drive 108, a shaft 110, a target 112, and one or more conduits 114. The pump 104 includes a gerotor 106, which may be mechanically or magnetically connected to the shaft 110. The pump 104 includes an inlet 116 and an outlet 118. As shown in FIG. 1, the conduits 114 provide a flow path between the fluid reservoir 102, the pump 104 and the target 112. In some examples, the example system 100 may include additional or different components, and the components may be arranged as shown or in another manner.

In some implementations, the example system 100 may be a hydraulic system, a coolant circulation system, a lubrication system, an engine oil system, a fuel delivery system, an air system, a humidification system, or may be used as another type of system. In some implementations, the example system 100 may be used in transportation vehicles, heavy-duty vehicles, construction equipment, racing and performance motor vehicles, aircrafts, watercrafts, and in another manner. In some implementations, the example system 100 may be used in clean fuel vehicles propelled by one of the following fuels, including compressed natural gas (CNG), liquified natural gas (LNG), liquified petroleum gas (LPG), or another fuel with alcohol (e.g., methanol or ethanol) or ether. In some implementations, the example system 100 may be used in zero-emission vehicles including vehicles operating on electricity or carbon-free fuels (e.g., hydrogen, or ammonia). In some instances, the target 112 may include an internal combustion engine, an electric motor, a fuel cell reactor, or another component in anther system. The fluid reservoir 102 may contain working fluid, which can be, for example, hydraulic oil, transmission oil, lubricant, coolant, reactant (e.g., liquid hydrogen, and compressed air), electrolyte, or another type of working fluid. In some instances, the conduits 114 may include materials that are compatible with the type of working fluid and pressure/temperature of the working fluid transported inside the conduits 114. In some instances, the conduits 114 may include materials such as plastic, metal, concrete, and anther material.

In some aspects of operation, the pump 104 drives fluid flow from the inlet 116 to the outlet 118, which circulates the working fluid between the fluid reservoir 102 and the target 112. The working fluid can be a liquid working fluid, a gaseous working fluid, a suspension of gas and liquid working fluids, or another phase of working fluid. In the example shown in FIG. 1, the action of the pump 104 draws fluid from the fluid reservoir 102, passes the fluid through the target 112 and circulates the fluid back to the fluid reservoir 102. Fluid flow through the pump 104 is produced by operation of the gerotor 106, which is driven by the drive 108. The drive 108 can be, for example, an electric motor, an engine, or another source of mechanical energy. The drive 108 transfers mechanical energy to the gerotor 106 via the shaft 110, which may be a crankshaft, a driveshaft, or another type of mechanical coupler device. The gerotor 106 may be driven in another manner, by another type of system.

In some implementations, the gerotor 106 includes at least two gears (a first gear and a second gear) housed together in a housing. In some implementations, both of the gears are rotors (gears that rotate in the housing during operation of the gerotor 106). In some implementations, one of the gears is a rotor (a gear that rotates) and the other is a stator (a gear that remains static). In some implementations, one of the gears (e.g., an inner gear or an outer gear) of the gerotor 106 is mechanically connected to (e.g., mounted on) the shaft 110 and is engaged with the other gear of the gerotor 106. In some implementations, one of the gears is magnetically coupled with the shaft 110, or the gear may be coupled to the shaft 110 in another manner.

Figure 2A:
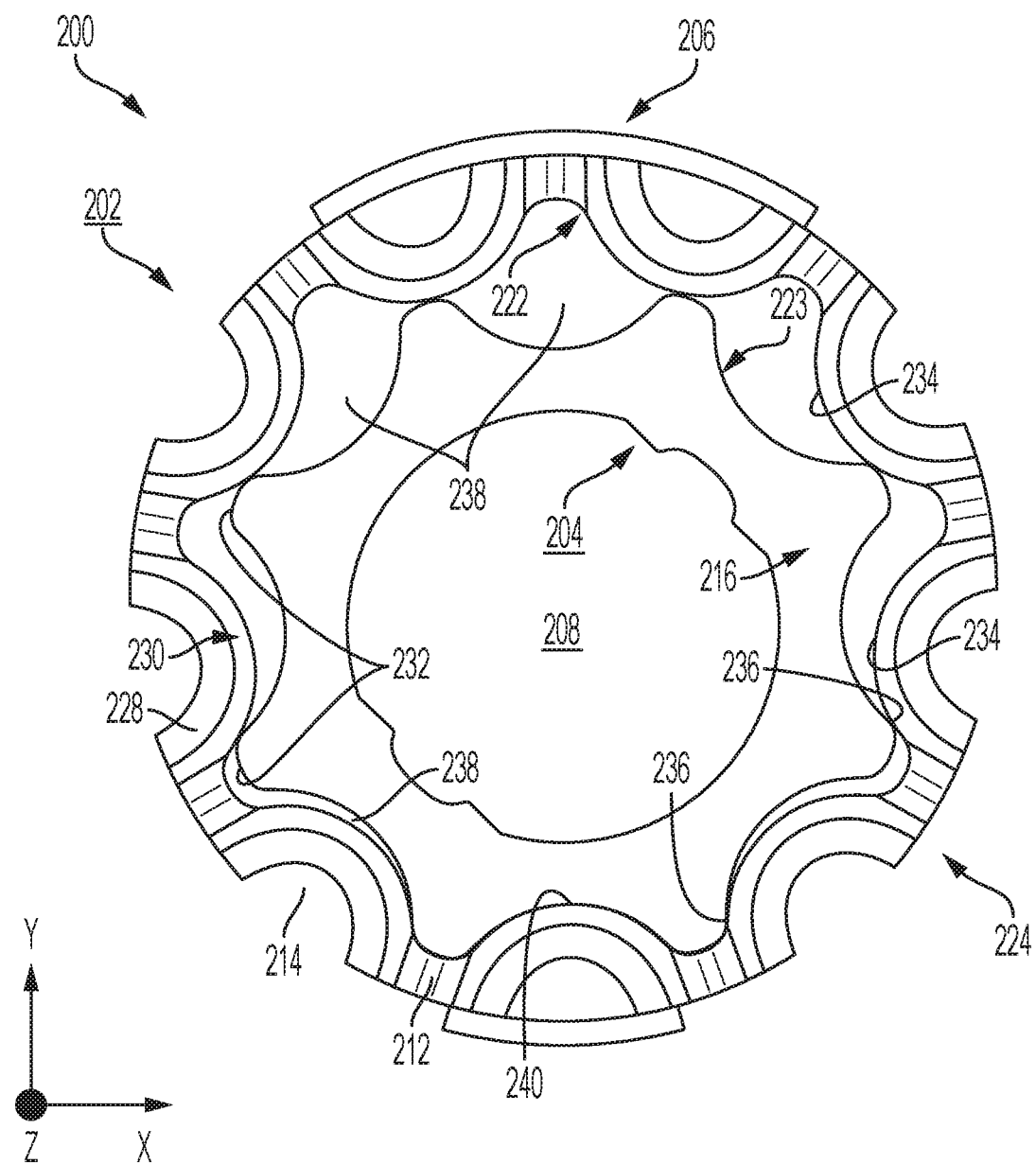
FIG. 2A is a side view of an example gerotor apparatus.

In some implementations, the first gear of the gerotor 106 is a smaller, inner gear with a series of outward-facing teeth, and the second gear is a larger, outer gear with a series of inward-facing teeth (e.g., the inner and outer gears 204, 202 shown in FIG. 2A). The first gear may reside inside the second gear. In some instances, the first and second gears of the gerotor 106 may be assembled eccentrically within the housing, such that they do not share a common central axis (with the central axis of one gear being parallel to, and offset from, the central axis of the other gear). In some instances, a number of teeth on the first, inner gear is one less than that of the second, outer gear.

In the examples shown, the inner and outer gear are configured to transfer working fluid from an inlet, through a flow chamber, to an outlet. For instance, the number of teeth and the relative locations of the central axes of the gears as they rotate cause the volumes (defined in the space between the gears) to change throughout a pumping cycle (e.g., as described in the pumping process 300 shown in FIG. 3). In some instances, the inlet 116 is positioned where each of the volumes begins to increase, which creates lower pressure to draw the fluid into the volume. In some instances, the fluid that is trapped in volumes between the gears is carried from the inlet 116 to the outlet 118. In some instances, the outlet 118 is positioned on the opposite side of the housing where the volumes begins to decrease.

The gears of the gerotor 106 may include metallic materials or non-metallic materials. In some cases, the gears are made of metallic materials such as stainless steel. In some cases, the gears are made of non-metallic materials such as plastic or ceramic materials.

In some implementations, the gerotor 106 includes one or more cutouts, ports or other features that are configured to enhance fluid communication within the housing (e.g., within the volumes defined between the gears). In some instances, the one or more cutouts, ports or other features can be defined on the inner gear, the outer gear, the housing or a combination of them. In some cases, the cutouts and ports do not create communication between the low-pressure side of the gerotor 106 (e.g., inlet) and a high-pressure side of the gerotor 106 (e.g., outlet). In some instances, flow-enhancing features of the inner gear or the outer gear may be configured according to the configuration and geometry of the housing.

In some implementations, a gear includes multiple ports that communicate fluid to or from a flow path defined by the gear. In the examples shown, a port through a surface communicates fluid through the surface, for instance, to a flow path toward another port through an opposite surface. For instance, a gear may include a first port and a second port, and a porting flow path through the gear. In some instances, the first port may be defined by an inner surface of the second gear between a pair of neighboring inward-facing teeth and the second port may be defined by an outer surface of the second gear. For example, the first and second ports may be implemented as the first and second ports 217, 219 shown in FIG. 2B, as the first and second ports 423, 425 shown in FIG. 4A, or in another manner. In some instances, each of the ports may be fluidically coupled to an axial flow path. For example, the first and second ports and the axial flow path may be implemented as the first and second ports 427, 429 of and the axial passage 424 shown in FIG. 4B, the first and second ports 423, 425 and the axial passage 434 shown in FIG. 4C, or in another manner. In certain instances, the first port may be defined by an outer surface of the first gear between a pair of neighboring outward-facing teeth and the second port may be defined by a top or a bottom surface of the first gear. In this case, the ports and the porting flow path may be implemented as the first, second and third ports 505, 507A and 507B and the axial passage 502 shown in FIG. 5, or in another manner.

In some implementations, one or more cutouts may be defined between neighboring pairs of teeth. For instance, a cutout may be defined by the inner surface of the second gear between a pair of neighboring inward-facing teeth, a cutout may be defined by the outer surface of the first gear between a pair of neighboring outward-facing teeth, or a plurality of such cutouts may be defined (on the first gear, the second gear or both). In the examples shown in the drawings, such a cutout in a surface enhances fluid communication along the surface, without communicating fluid directly into another flow path defined by the gear (e.g., without communicating fluid directly into a port to a porting flow path to a port on another surface of the gear). The cutout can be a chamfer cut, a boss cut, a extrude cut or another type of cut into a portion of the surface that defines a profile of a gear. In some cases, the cutout preserves the conjugate profiles of the gears. In some instances, the cutout may be implemented as the chamfered edge 442 shown in FIG. 4D, the radiused edge 444 shown in FIG. 4D, or the breakout cut 446 shown in FIG. 4D, the cutouts 632 shown in FIG. 6 or in another manner. In some instances, communicating the fluid in a volume along the one or more cutouts can enhance the fluid flow to provide an improved flow rate, to reduce irregularities (e.g., pressure drop, noise and vibration) or to provide other advantages during operation.

In some instances, the first and second gears of the gerotor 106 may be implemented as any of the example gears shown in FIGS. 2A, 2B, 4A, 4B, 4C, 4D, 4E, 5, and 6. For instance, one or both of the gears may include one or more flow-enhancing flow paths (e.g., cutouts, ports or both) of the type shown in FIGS. 2A, 2B, 4A, 4B, 4C, 4D, 4E, 5, and 6; or a gear may include other types of features. A cutout, port or other flow-enhancing feature of a gear may have another geometry, shape, size, orientation, etc.

Figure 2B:
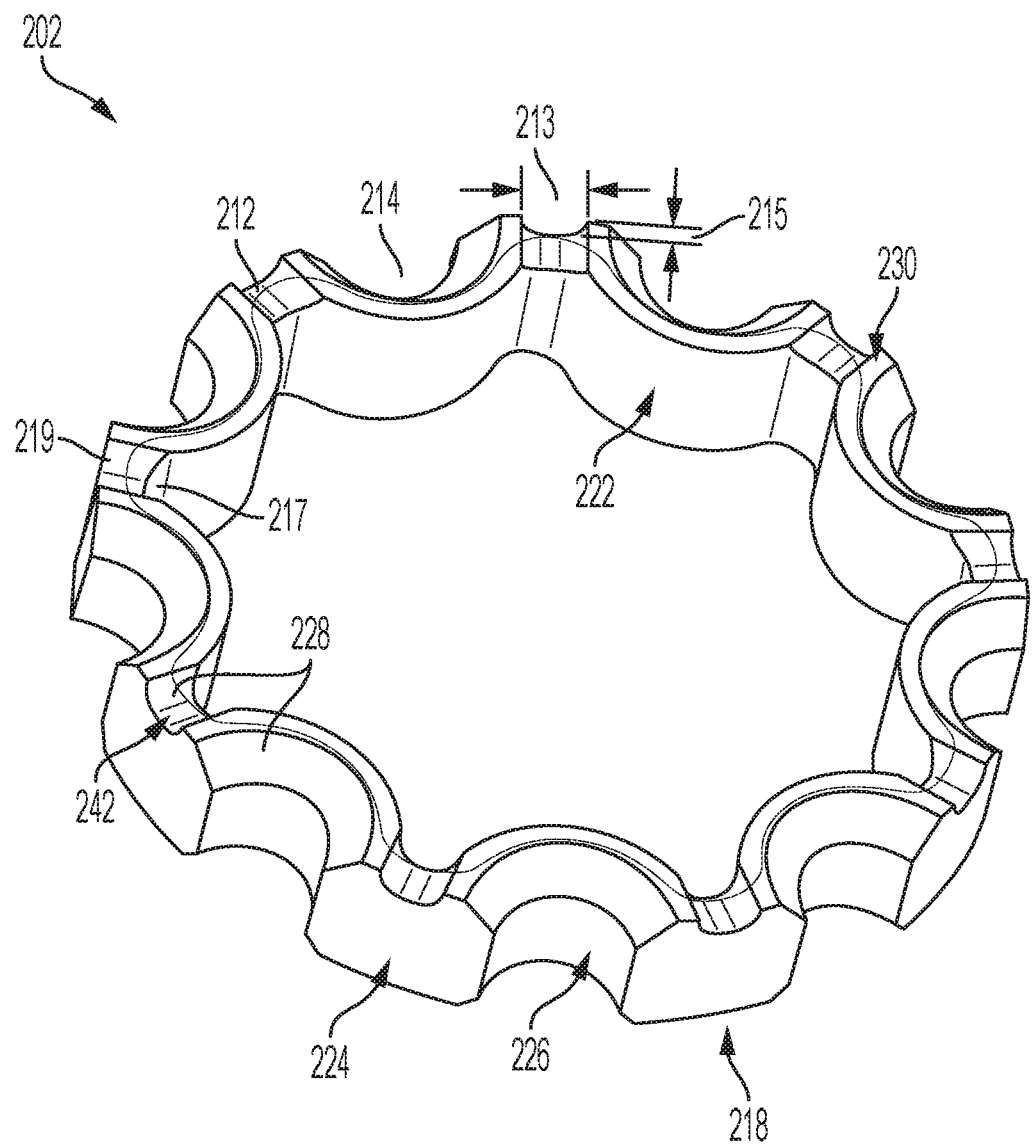
FIG. 2B is a perspective view of the outer gear 202 shown in FIG. 2A.

FIG. 2A is a side view of an example gerotor apparatus 200. The example gerotor apparatus 200 shown in FIG. 2A includes an outer gear 202 and an inner gear 204. FIG. 2B shows a perspective view of the outer gear 202. As shown in FIG. 2A, the inner gear 204 includes a central opening 208 to receive a shaft (e.g., the shaft 110 shown in FIG. 1). The outer and inner gears 202, 204 reside in a housing 206. In some instances, the housing 206 may include an inlet and an outlet. In some examples, the example apparatus 200 may include additional or different components, and the components may be arranged as shown or in another manner.

As shown in FIG. 2A, the inner gear 204 is smaller than the outer gear 202 and resides inside the outer gear 202 (inside a central opening in the outer gear 202). The outer gear 202 includes a series of inward-facing teeth 234, and the inner gear 204 includes a series of outward-facing teeth 232. In the example shown, the inner gear 204 has fewer teeth than the outer gear 202. The difference between the number of teeth on the inner and outer gears can be one, two, another small number. In the example shown in FIG. 2A, the inner gear 204 has eight teeth, and the outer gear has nine teeth. The gears may be constructed with another number of teeth. For example, the inner gear may have nine teeth while the outer gear has ten teeth (e.g., as in the outer gears 430, 440, 602 shown in FIGS. 4C, 4D, 4E and 6, and the inner gear 604 shown in FIG. 6).

As shown in FIG. 2A, the outer gear 202 has an outer surface 224 that mates with an inner surface of the housing 206 to prevent leakage between the outlet and the inlet. The outer gear 202 further includes an inner surface 222 that mates with an outer surface 223 of the inner gear 204. The outer surface 223 of the inner gear 204 defines an outer profile of the inner gear, and the inner surface 222 of the outer gear 202 defines an inner profile of the outer gear. The inner and outer gears have conjugate profiles, such that the inner and outer gears can operably engage each other (e.g., seal against one another) to rotate together while contacting each other at varying contact points to define varying fluid volumes between the gears. For instance, the outer surface 223 of the inner gear 204 and the inner surface 222 of the outer gear 202 may have conjugate trochoid profiles, cycloid profiles, hypotrochoid profiles, elliptical profiles, epitrochoid profiles, or other types of profiles. As shown in FIG. 2A, the inner gear 204 and the outer gear 202 have conjugate trochoidal profiles that are shifted off center from each other. The inner gear 204 and the outer gear 202 is machined with matching, intersecting circular arcs. In some instances, the outer and inner gears 202, 204 mesh precisely at a meshing position 240.

As shown in FIG. 2B, the outer gear 202 also has two parallel side surfaces (a top surface 230 and a bottom surface 218 (not visible)), which may form seal contacts with the housing 206. Similarly, the inner gear 204 has two parallel side surfaces (a top surface 216 and a bottom surface (not visible)), which may also form seal contacts with the housing 206. In some instances, the top surface 230 of the outer gear 202 and the top surface 216 of the inner gear 204 are flush. In some instances, the top surfaces 216 and 230 may seal with the housing 206 with a close tolerance allowing the example apparatus 200 to develop suction at the inlet and prevent liquid from leaking back from the outlet.

As shown in FIG. 2A, the example apparatus 200 includes multiple volumes 238. The volumes 238 are defined by the contact points between the inner surface 222 of the outer gear 202 and the outer surface 223 of the inner gear 204. In some implementations, each of the volumes 238 has a volume that changes during rotation of the outer and inner gears 202, 204. In some aspects of operation, the inner surface 222 of the outer gear 202 and the outer surface 223 of the inner gear 204 remain in sliding contact at multiple distinct points to form nominal line seals 236. In some instances, each of the volumes 238 may be isolated from neighboring volumes 238 by the nominal line seals 236.

In some instances, the inner gear 204 is a driver gear and the outer gear 202 is a driven gear, with both gears rotating in the same direction during operation. In some instances, a shaft engaged with the inner gear 204 via the central opening 208 transfers torque to the inner gear 204 and drives the inner gear 204 to rotate about the main axis (z-axis of a cylindrical coordinate system) of the shaft. In some instances, the inner gear 204 rotating at a first angular speed is controlled by a drive (e.g., the drive 108 shown in FIG. 1) applied on the shaft. The rotating inner gear 204 drives the outer gear 202 to rotate at a second, different angular speed. In some instances, the first angular speed of the inner gear 204 is greater than the second angular speed of the outer gear 202. The difference between the first and second angular speeds creates an expanding volume in the volumes 238 near the inlet and a reducing volume in the volumes 238 near the outlet.

In some aspects of operation, as working fluid is drawn through the inlet (e.g., drawn into the interior volume of a housing), the working fluid travels into an expanding volume between the gears and is contained in the volumes 238. The working fluid moves through the housing 206 in the volume 238 as the outer and inner gears 202, 204 continue to rotate. The working fluid is then transferred to the outlet and discharged by the reducing volume of the volumes 238, as the working fluid is forced out through the outlet. In some instances, the working fluid at the inlet is subject to a first, lower pressure and the working fluid discharged at the outlet is subject to a second, higher pressure.

As shown in FIG. 2B, the outer gear 202 includes porting flow paths 212 defined on the top surface 230 between ports through the inner and outer surfaces 222, 224. Each of the porting flow paths 212 is defined between a pair of neighboring inward-facing teeth 234. As shown in FIG. 2B, each of the porting flow paths 212 may have a depth 215 in a range of 1.5-3.2 millimeters (mm) and a width 213, which may be determined according to the size of the teeth (e.g., space width, circular thickness, etc.). In some instances, the porting flow paths 212 may be defined with different shapes, along different directions, or with different geometries.

In some instances, each of the porting flow paths 212 provides fluid communication between a first port 217 defined by the inner surface 222 and a second port 219 defined by the outer surface 224 of the outer gear 202. In some instances, each of the porting flow paths 212 forms a first, radial path to guide fluid between the first and second ports 217, 219. In some instances, the volume 238 may directly receive fluid from the inlet or directly discharge the fluid to the outlet without going through the porting flow paths 212. In certain instances, the porting flow paths 212 may reside on the bottom surface 218 of the outer gear 202 according to the position and configuration of the inlet and outlet in the housing 206. In some instances, the porting flow paths 212 may be reconfigured within the body of the outer gear 202 (e.g., defined by an interior surface between the top and bottom surfaces 230, 218 of the outer gear 202), in any combination thereof, or in another manner.

As shown in FIGS. 2A and 2B, the outer gear 202 further includes multiple axial passages 214 along the axial direction (z-axis, in cylindrical coordinates, parallel to the axis of rotation of the gear 202). Each of the axial passages 214 is defined by the outer surface 224 of the outer gear 202, which intersect with the top and bottom surfaces 230, 218, forming fluid passages between the top and bottom surfaces 230, 218. Each of the axial passages 214 resides on the root of a respective outward-facing tooth 234. In some examples, the root of each tooth 234 may include multiple axial passages 214 positioned along the outer surface 224, in the body of the tooth 234, or in another manner. As shown, the example axial passages 214 are not fluidically connected to the example porting flow paths 212.

As shown in FIG. 2B, the top surface 230 of the outer gear 202 and the surfaces 226 of the axial passages 214 are connected via respective transitional edges 228. Similarly, the top surface 230 and inner surfaces 242 of the porting flow paths 212 are connected with respective transitional edges 228. In some instances, the transitional edges 228 may be created by removing sharp edges using techniques, such as chamfering, filleting or in another manner. Also shown in FIG. 2B, the transitional edges 228 may be straight, sloped, angled, rounded or in another profile.

In some implementations, the porting flow paths 212 can preserve the structural integrity of the outer gear 202. In some instances, the outer gear 202 remains a monolithic component. In some instances, the porting flow paths 212 or the axial passages 214 are formed on the outer gear 202 using machining methods that do not introduce deforming, breaking or any other mechanical failure to the outer gear 202, the inner gear 204 or to the housing 206.

In some implementations, the example apparatus 200 may be modified to further include one or more additional cutouts that are configured to enhance fluid flow in the volumes 238. In some instances, the cutouts further increase the surface area of one or both of the gears, for example, while preserving their conjugate profiles. In some instances, each of the one or more cutouts can be a boss cut, an extrusion cut or another type of cut that removes material from some portion of a surface, relative to the working profile defined by the surface. In some instances, each of the one or more cutouts can be in the form of an edge transition, an edge cutout, a well, a channel, a groove, a cavity, a slot or another type of opening that terminates within the body of a gear.

Figure 3:
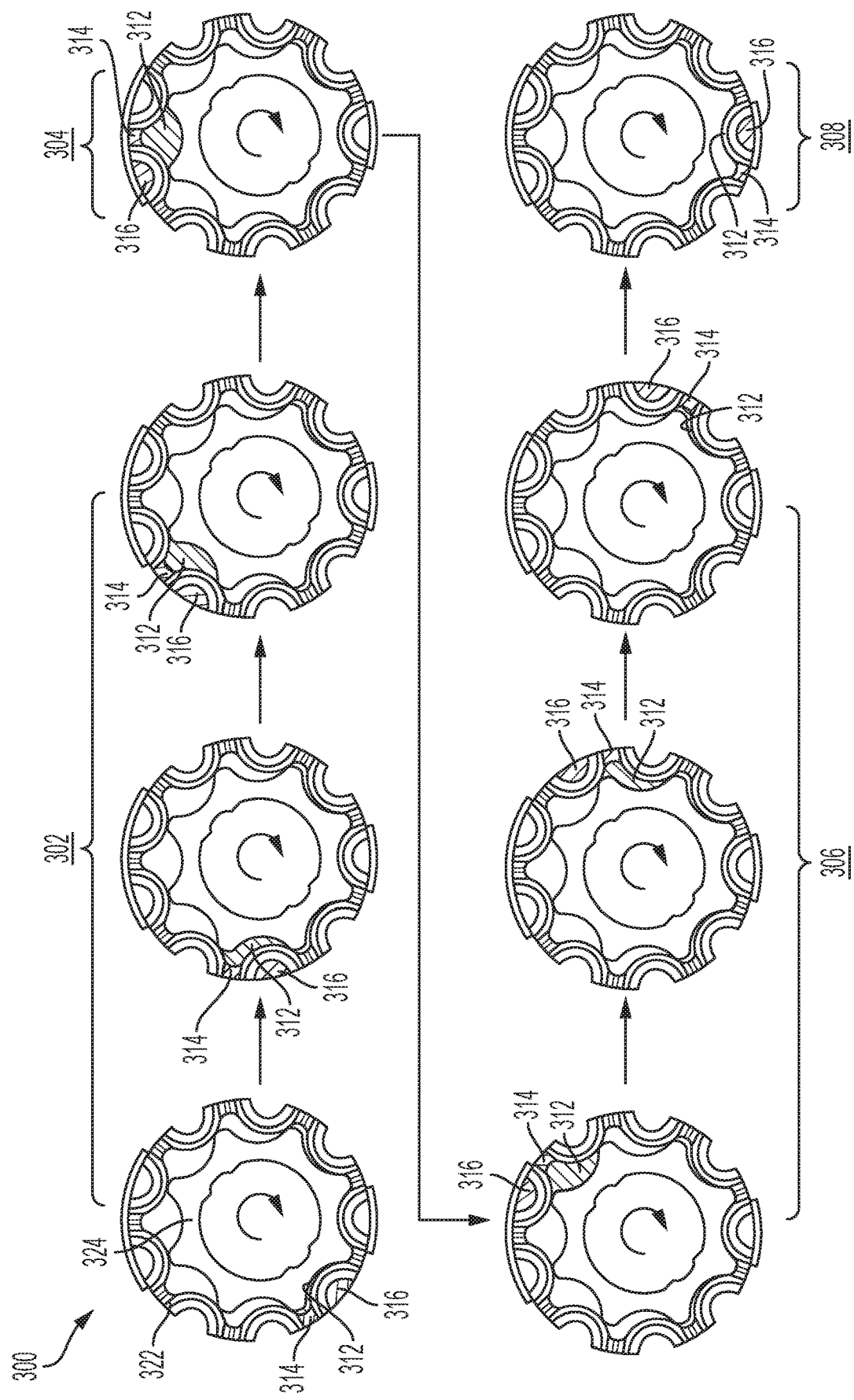
FIG. 3 a flowchart showing an example pumping process.

FIG. 3 is a flowchart showing an example pumping process 300. In some implementations, aspects of the example process 300 allow a gerotor to operate at a high angular speed with a high volumetric efficiency and low irregularities. For instance, operations in the example process 300 are illustrated using the example gerotor apparatus 200 shown in FIGS. 2A and 2B with the porting flow paths 212. For clarity purposes, the following description of the example process 300 describes fluid in one of the volumes 238, one of the porting flow paths 212, and one of the axial passages 214 during a pumping cycle. The same description and behavior applies to all of the volumes 238. Aspects of the example process 300 are applicable to other gerotor apparatus that have different types of flow-enhancing features shown (e.g., shown in FIGS. 4A, 4B, 4C, 4D, 4E, 5, 6).

In some instances, the example process 300 may be performed by another type of pump. The example process 300 may include additional or different operations, the operations may be performed in the order shown or in another order. In some cases, operations in the example process 300 can be combined, iterated or other repeated or performed in another manner.

As shown in FIG. 3, the gerotor includes an outer gear 322 and an inner gear 324, which may be implemented as the outer gear 202 and the inner gear 204 shown in FIGS. 2A and 2B or in another manner. The gerotor further includes multiple volumes 312 formed between the outer and inner gear 322, 324, multiple porting flow paths 314 and multiple axial passages 316, which may be implemented as the volumes 238; the porting flow paths 212 and the axial passages 214 as shown in FIGS. 2A and 2B or in another manner.

At 302, fluid is drawn into the housing into a volume 312 between the inner and outer gears. As the inner gear 324 and the outer gear 322 rotate at different angular speeds through the beginning of a cycle, an expanding volume 312 is created. In some instances, the pressure in the expanding volume is reduced. The resulting low pressure pulls working fluid from an inlet into the volume 312, when the fluid from the inlet gains access to the porting flow path 314. As the outer and inner gears rotate, the fluid continues to fill the volume 312 via the porting flow path 314 according to the configuration of the inlet in the housing. In some instances, the volume 312 is filled with a first portion of the fluid, and the porting flow path 314 is filled with a second portion of the fluid, and the axial passage 316 is filled with a third portion of the fluid.

At 304, fluid is transferred through the housing. In some instances, the first, second and third portions of the fluid in the volume 312, the porting flow paths 314 and the axial passage 316 are transferred away from the inlet as the outer and inner gears 322, 324 rotate in the housing. At the position shown at 304, the porting flow paths 314 and the axial passage 316 on the outer gear 322 do not create fluidic communication between neighboring volumes and thus do not short a high-pressure outlet region and a low-pressure inlet region.

At 306, fluid is discharged from the volume 312. As the outer and inner gears 322, 324 continue to rotate through the cycle, the first portion of the fluid in the volume 312 is discharged out of the outlet directly or indirectly via the porting flow path 314. In some instances, the second and third portions of the fluid remain in the porting flow path 314 and the axial passage 316 as the outer and inner gears 322, 324 rotate from the outlet back to the inlet in order to continuously receive and pump fluid from the inlet to the outlet. In some instances, the first portion of the fluid when discharged at the outlet may be pressurized.

At 308, the second and third portions of the fluid transferred. In some instances, the outer and inner gears 322, 324 return to the beginning of a new cycle after the first portion of the fluid has been discharged from the volume 312 through the outlet. In some instances, complete (or substantially complete) discharge of the first portion of the fluid is accomplished by meshing profiles of the inner surface of the outer gear 322 and the outer surface of the inner gear 324 at the meshing position; e.g., the volume 312 is minimal (e.g., in some cases effectively zero) at the end of a cycle. As shown in FIG. 3, the second and the third portions of the fluid in the porting flow path 314 and the axial passage 316 are returned to the inlet together with the rotating gears 322, 324 without being fully discharged at the outlet. In some instances, the second portion of the fluid residing locally in the porting flow path 314 in adjacent to the volume 312 may quickly gain its access to and fill in the expanding volume of the volume 312 when teeth move away from the meshing position and before the incoming fluid from the inlet gains access to the volume 312. In some instances, the second portion of the fluid in the porting flow path 314 can fill in the expanding volume in the volume as the outer and inner gears 322, 324 rotate in a following pumping cycle. In some implementations, the fluid communication between the second portion of the fluid in the porting flow path 314 and the volume 312 during the entire pumping cycle can increase flow area, and reduce pressure drop.

In some instances, the third portion of the fluid in the axial passage 316 returned from the outlet may be inactive toward contributing to the flow enhancement, e.g., filling in the expanding volume in the volume 312. In certain instances, when the axial passage 316 is fluidically coupled with the porting flow path 314, the third portion of the fluid may contribute to the flow enhancement.

FIGS. 4A, 4B, 4C, 4D, and 4E show example gears 400, 420, 430, 440. In some instances, the gears 400, 420, 430, 440 may be used as an outer gear in a gerotor apparatus. In some instances, the gerotor apparatus may be implemented as the gerotor apparatus 200 as shown in FIG. 2A and operated as described with respect to FIG. 3, or in another manner. As shown in FIGS. 4A, 4B, 4C, 4D, and 4E, each of the example gears 400, 420, 430, 440 includes at least four external surfaces, including an inner surface (that defines an inner profile of the gear), an outer surface (that defines an outer profile of the gear), a top surface and a bottom surface. Each of example gears 400, 420, 430, 440 has a series of inward-facing teeth.

Figure 4A:
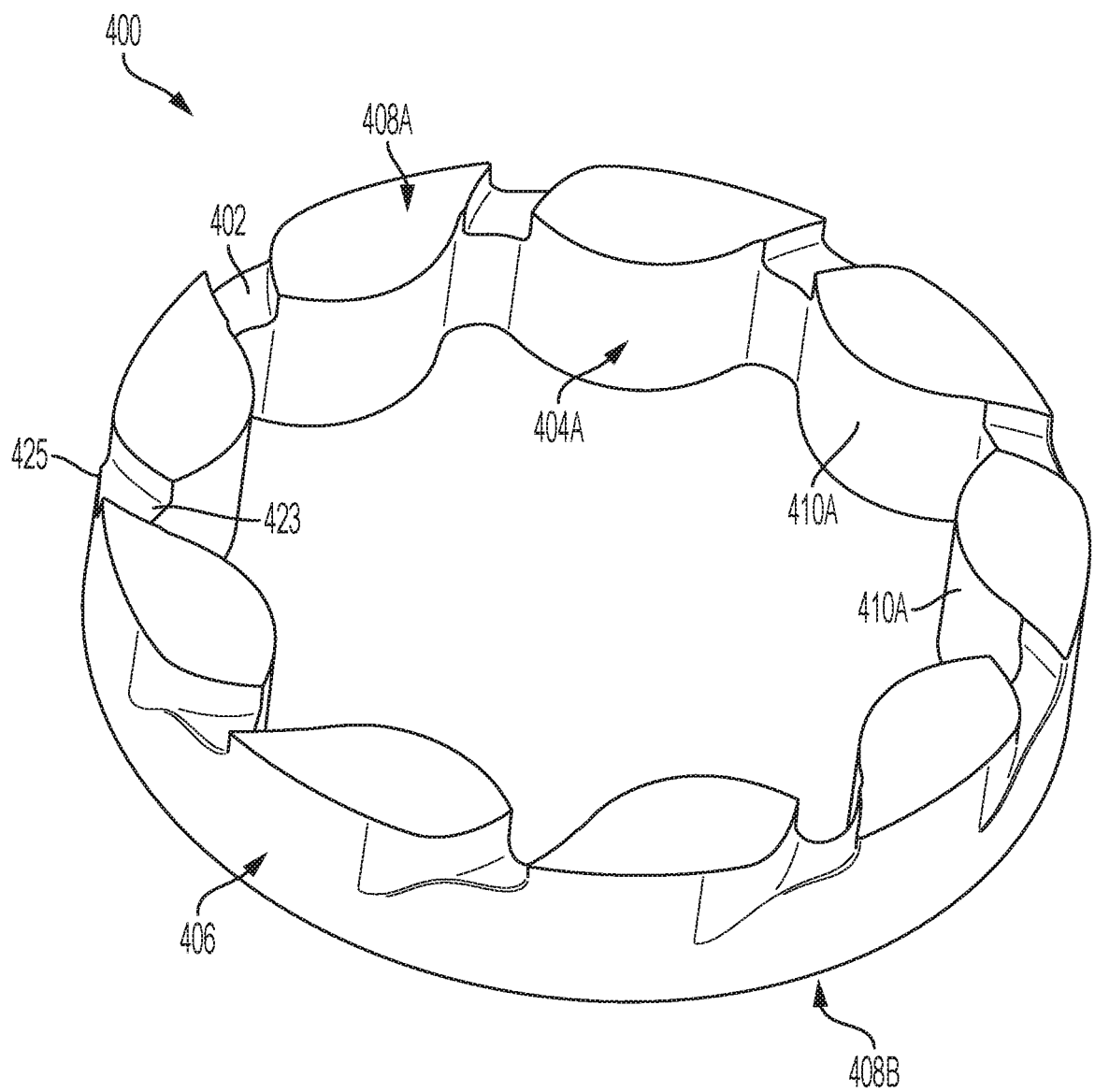
FIG. 4A is a perspective view of an example outer gear.

FIG. 4A is a perspective view of an example outer gear 400. As shown in FIG. 4A, the gear 400 includes multiple porting flow paths 402 which are defined by the top, inner and outer surfaces 408A, 404A, 406A. Each of the porting flow paths 402 may be a through port which has a first port 423 on the inner surface 404A and a second port 425 on the outer surface 406A. The porting flow path 402 provides fluid communication between the first and second ports 423, 425. As shown in FIG. 4A, the first port 423 is defined by the inner surface 404A between a pair of neighboring inward-facing teeth 410A. The porting flow path 402 has a curved shape which extends from the inner surface 404A to the outer surface 406A in both radial and angular directions. In some implementations, internal sidewalls of the porting flow paths 402 have smooth transitional edges to the outer and inner surfaces 404A, 406A as shown in FIG. 4A. The smooth transitional edges may facilitate fluid flow into or out of volumes between the gears (e.g., the volumes 238 shown in FIG. 2A). In some instances, the curvature and geometry of the porting flow path 402 may be determined according to the angular speed, output pressure or other performance specifications.

Figure 4B:
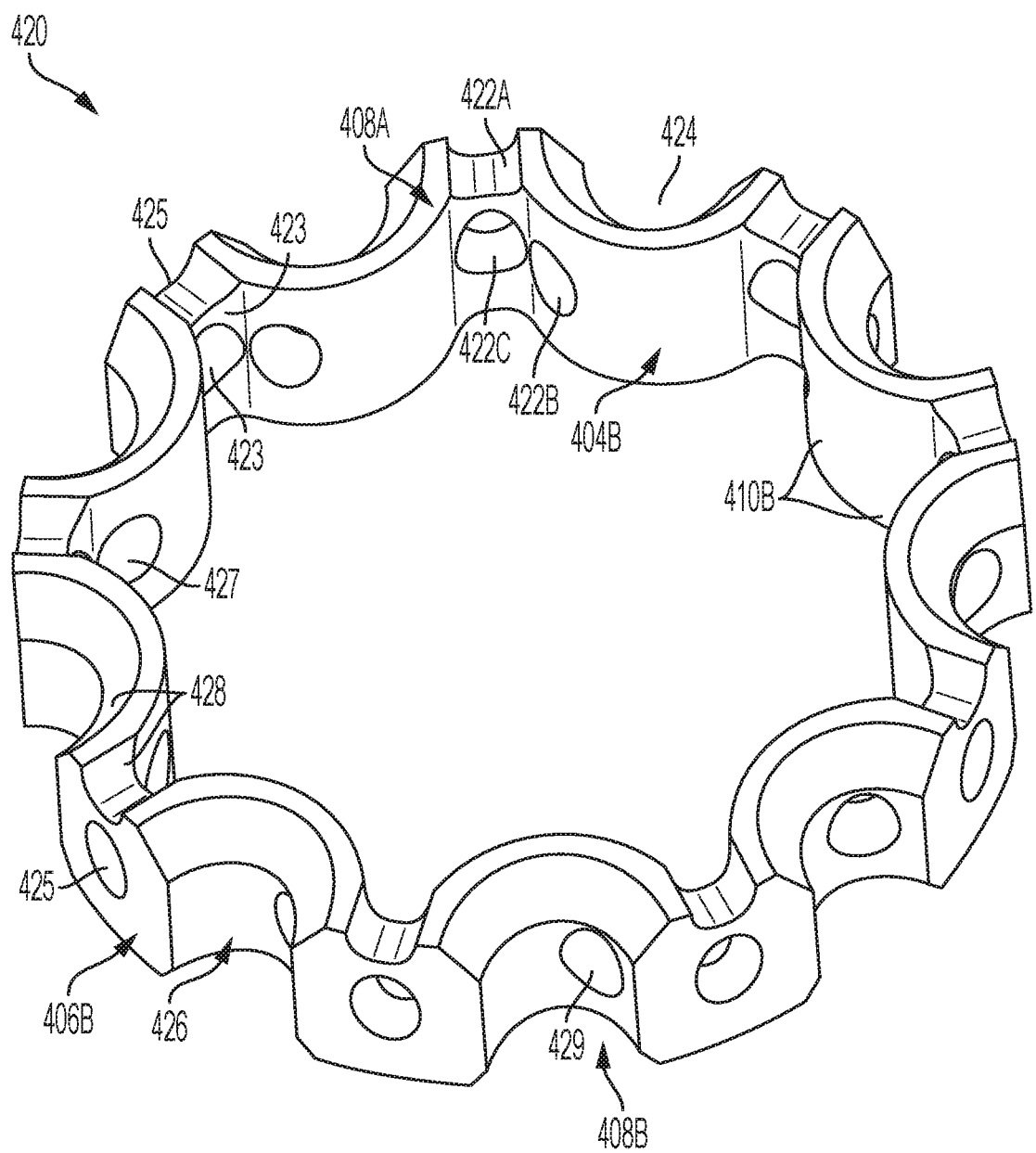
FIG. 4B is a perspective view of another example outer gear.

FIG. 4B is a perspective view of another example outer gear 420. As shown in FIG. 4B, the gear 420 includes first porting flow paths 422A, second porting flow paths 422B, third porting flow paths 422C, and axial passages 424. In some instances, the first and third porting flow paths 422A, 422C communicate fluid between ports defined by the inner and outer surfaces 404B, 406B between a pair of neighboring inward-facing teeth 410B. Each of the first and third porting flow paths 422A, 422C provides fluid communication, e.g., a first porting flow path between a first port 423 defined by the inner surface 404B of the gear 420 and a second port 425 defined by the outer surface 406B of the gear 420. Each of the first and third porting flow paths 422A, 422C is configured as a first radial path to guide fluid between the first and second ports 423, 425 along a first radial direction of the gear 420. In some instances, the first porting flow paths 422A defined on the top surface 408A and the axial passages 424 of the gear 420 may be implemented as the porting flow paths 212 and the axial passages 214 of the outer gear 202 shown in FIGS. 2A and 2B or in another manner. In some instances, the third porting flow paths 422C are defined in the body of the gear 420 between the top and bottom surfaces 408A, 408B. In some instances, the second porting flow paths 422B communicate fluid between ports defined by the inner surface 404B and a surface 426 of the axial passages 424. The second porting flow paths 422B reside in the body of inward-facing teeth 410B between the top and bottom surfaces 408A, 408B. Each of the second porting flow paths 422B provides fluid communication, e.g., a second porting flow path between a third port 427 defined by the inner surface 404B of the gear 420 and a fourth port 429 defined by the surface 426 of the axial passage 424. Each of the second porting flow paths 422B is configured as a second radial path to guide fluid between the third and fourth ports 427, 429 along a second direction. In some implementations, sidewalls of the porting flow paths 422A on the top surface 408A of the gear 420 and the surfaces 426 of the axial passages 424 may have smooth transitional edges 428. The smooth transitional edges 428 may facilitate fluid flow into or out of volumes between the gears (e.g., the volumes 238 shown in FIGS. 2A and 2B). In some instances, the second and third porting flow paths 422B, 422C may also include transitional edges which may be implemented as the transitional edges 428 or in another manner.

Figure 4C:
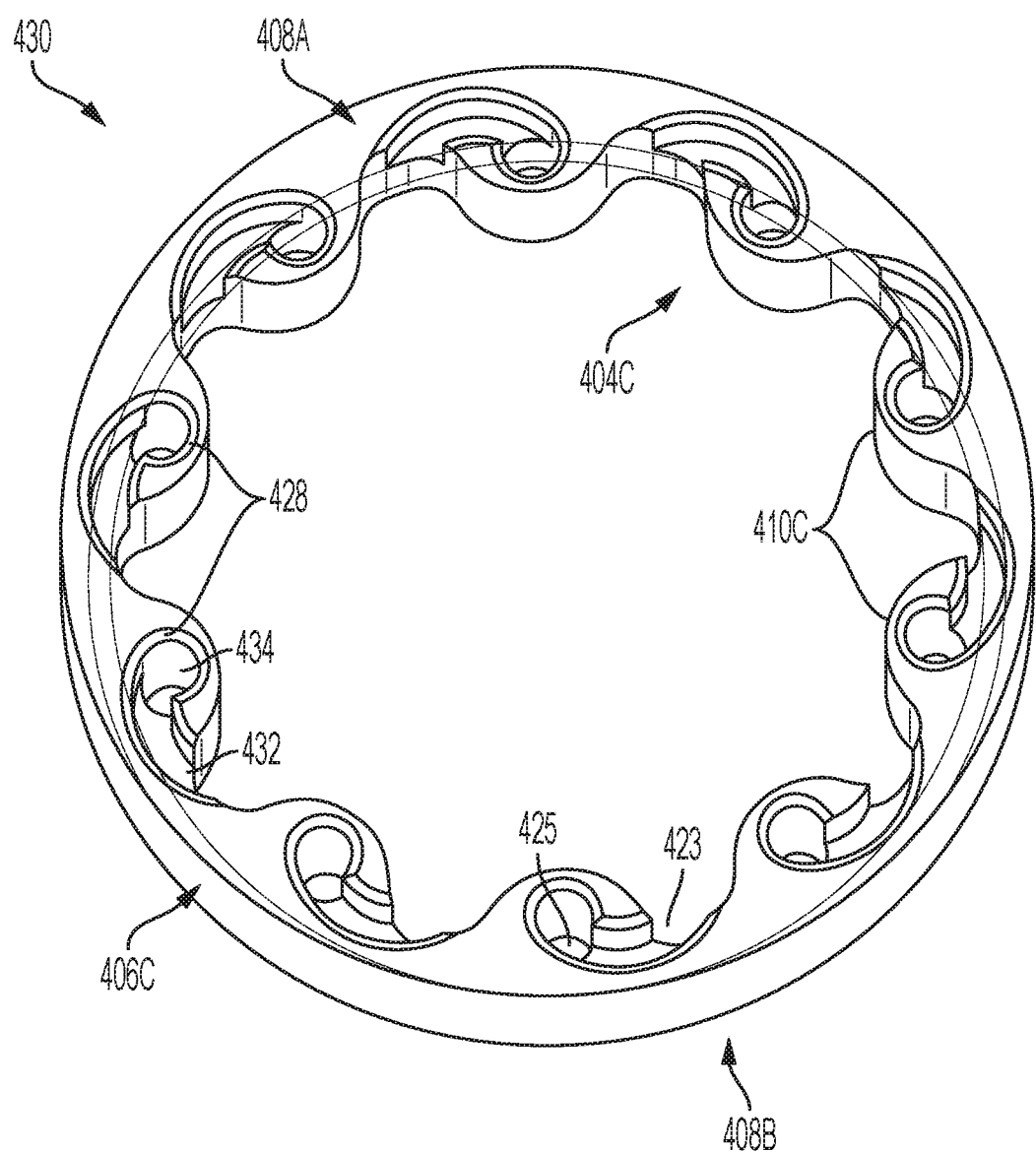
FIG. 4C is a perspective view of another example outer gear.

FIG. 4C is a perspective view of another example outer gear. As shown in FIG. 4C, the gear 430 includes multiple porting flow paths 432 and multiple axial passages 434. Each of the porting flow paths 432 is fluidically coupled with a respective axial passage 434. Similar to the porting flow paths 402 shown in FIG. 4A, the porting flow paths 432 are defined by the top surface 408A and the inner surface 404C. The fluidically-coupled porting flow path 432 and axial passage 434 form a through port extending from the inner surface 404C to the bottom surface 408B of the gear 430. The through port has a first port 423 defined by the inner surface 404C and a second port 425 defined by the bottom surface 408B. The first port 423 of the porting flow path 432 resides between a pair of neighboring inward-facing teeth 410C. The fluidically-coupled porting flow paths 432 and axial passage 434 provide a porting flow path between the first and second ports 423, 425. In some instances, the porting flow path 432 does not extend to the outer surface 406C. In some instances, the axial passage 434 resides in the body of a tooth 410C. As shown in FIG. 4C, the porting flow path 432 has a curved shape and extends from the first port 423 to the axial passage 434. In some implementations, sidewalls of the porting flow paths 432 and the axial passages 434 may have smooth transitional edges 428 to the top and bottom surfaces 408A, 408B as shown in FIG. 4C, or in another manner. The smooth transitional edges 428 may facilitate fluid flow into or out of volumes between the gears (e.g., the volumes 238 shown in FIG. 2A). In some instances, the curvature and geometry of the porting flow path 432 may be determined according to the angular speed, output pressure or other performance specifications.

Figure 4D:
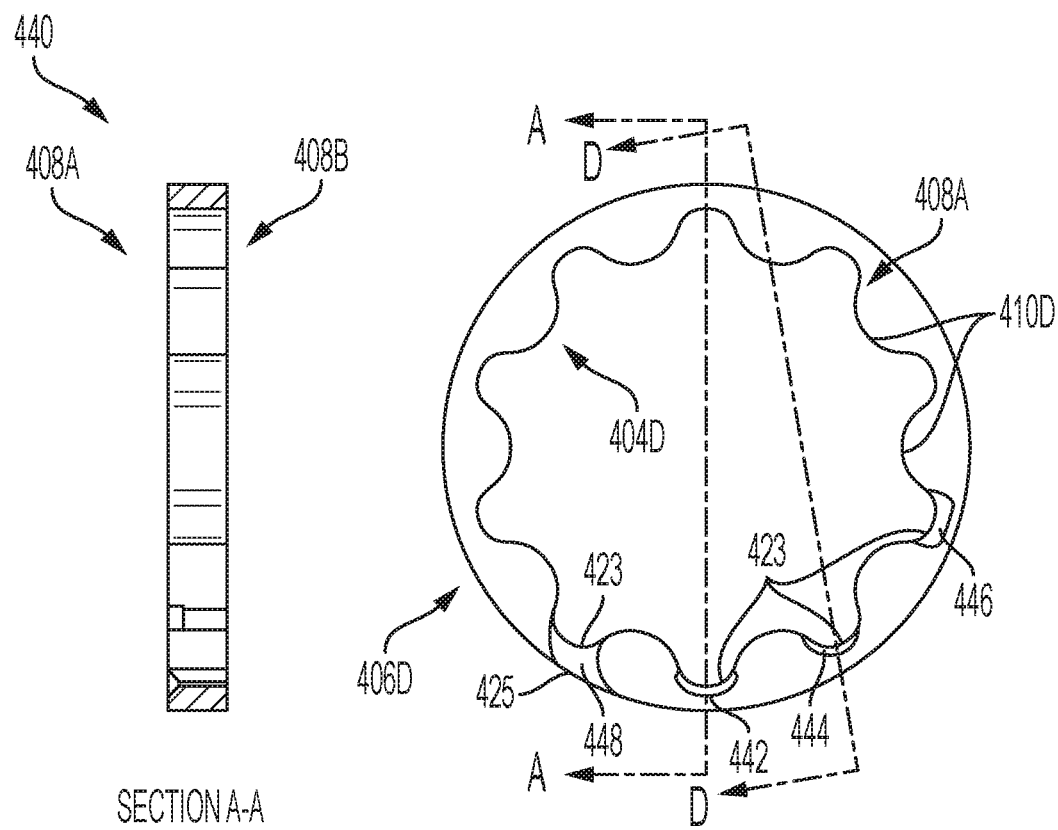
FIG. 4D shows two side views of another example outer gear.

FIG. 4D shows two side views of another example outer gear 440. As shown in FIG. 4D, the gear 440 includes multiple cutouts defined in the inner surface 404D. The example cutouts shown in FIG. 4D are edge transitions between exterior surfaces of the gear 440. In particular, the gear 440 includes a chamfered edge 442, a radiused edge 444, and a breakout cut 446. Each of the cutouts (the chamfered edge 442, the radiused edge 444 and the breakout cut 446) is defined at an edge where the top surface 408A intersects the inner surface 404D, and resides between a pair of neighboring teeth 410D. Cutouts may be defined in other locations, for example, along other edges or surfaces. Each of the chamfered edge 442, the radiused edge 444 and the breakout cut 446 may be implemented with different shapes and geometries, in different combinations thereof, or in another manner. The example cutouts shown in FIG. 4D may include smooth transitional edges that facilitate fluid flow into or out of volumes (e.g., the volumes 238 shown in FIG. 2A) between gears during operation of a gerotor apparatus. The gear 440 also includes through port 448, which may be implemented as the porting flow path 402 shown in FIG. 4A or in another manner.

Figure 4E:
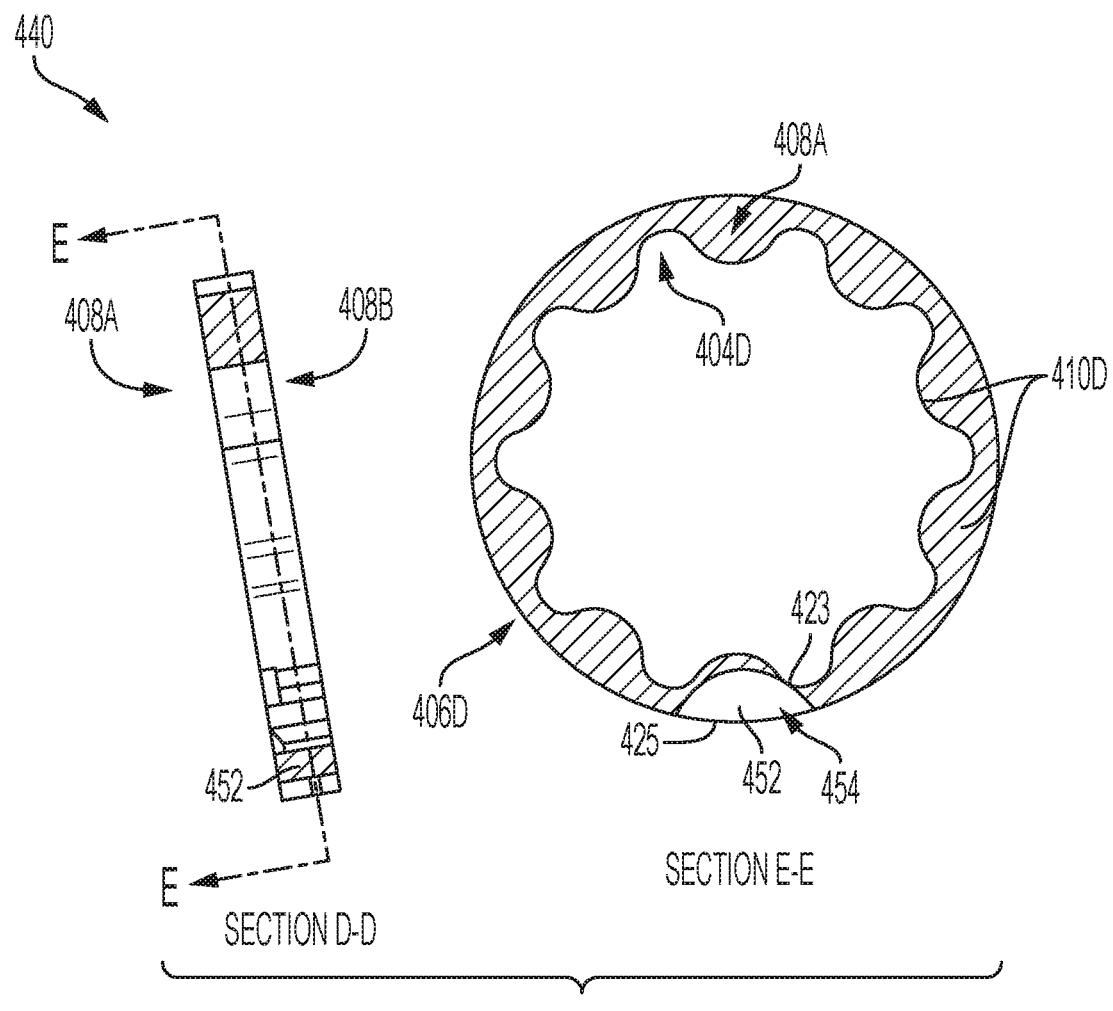
FIG. 4E shows two cross-sectional views of the outer gear 440 shown in FIG. 4D.

FIG. 4E shows two cross-sectional views of the outer gear 440 shown in FIG. 4D. As shown in FIG. 4E, the gear 440 includes an interior surface that defines a radial port 452 through the body of the gear 440 between the top and bottom surfaces 408A, 408B. The example radial port 452 communicates fluid between a first port 423 defined by the inner surface 404D and a second port 425 defined by the outer surface 406D. As shown in FIG. 4E, the first port 423 resides between a pair of neighboring inward-facing teeth 410D. In some instances, the gear 440 may include a series of such radial ports 452 between neighboring pairs of teeth.

Figure 5:
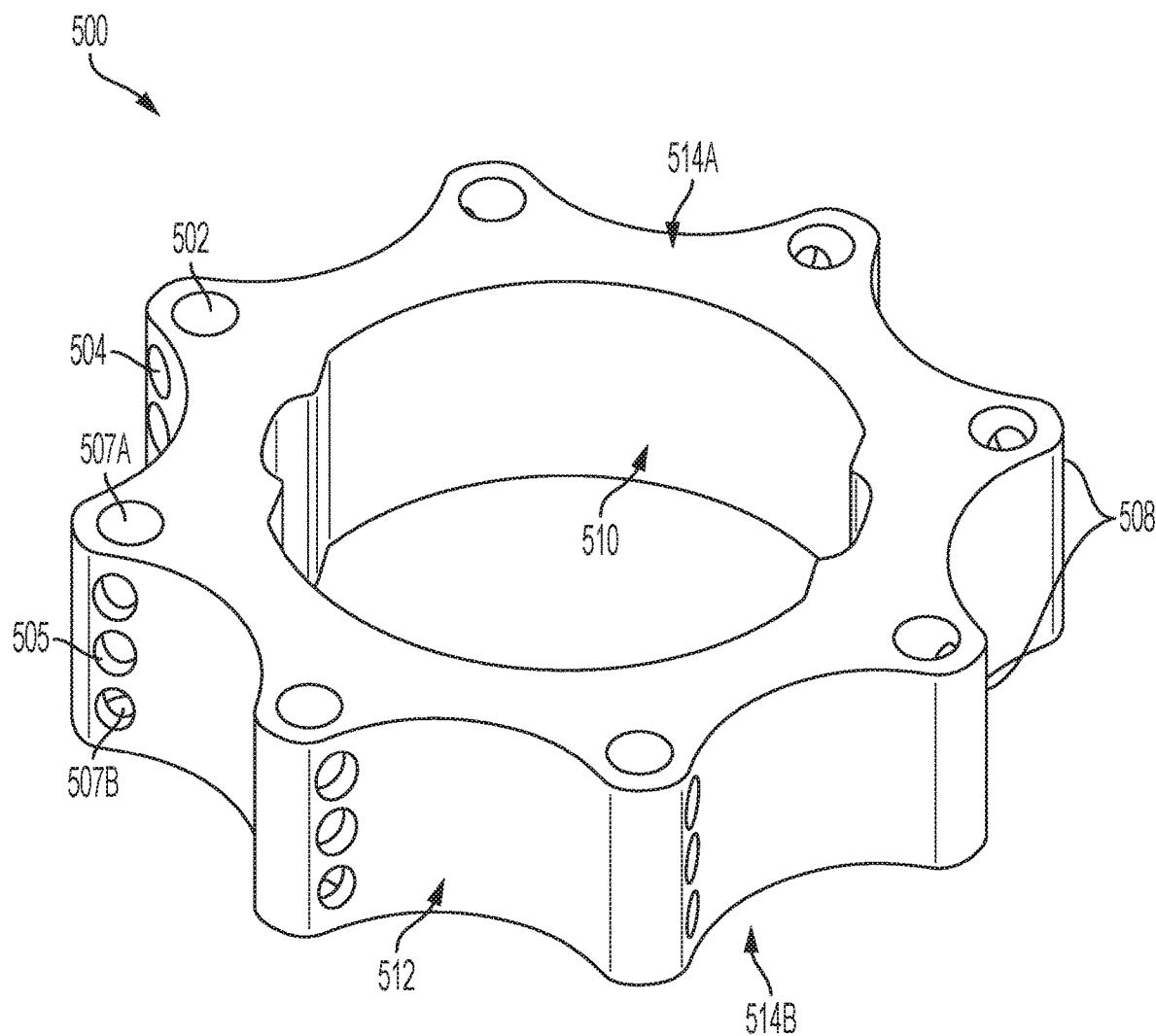
FIG. 5 is a perspective view of an example inner gear.

FIG. 5 is a perspective view of an example inner gear 500. In some instances, the gear 500 may be implemented as an inner gear in a gerotor apparatus or in another type of gear pump. In some instances, the gerotor apparatus may be implemented as the gerotor apparatus 200 as shown in FIG. 2A and operated as described in FIG. 3, or in another manner.

As shown in FIG. 5, the example gear 500 includes at least four external surfaces, including an inner surface 510, an outer surface 512, a top surface 514A and a bottom surface 514B. The example gear 500 further includes a series of outward-facing teeth 508. The example gear 500 further includes multiple porting flow paths 504 and multiple axial passages 502. In some instances, the porting flow paths 504 extend from ports in the outer surface 512 through the body of the gear 500 between the top and bottom surfaces 514A, 514B. Each of the porting flow paths 504 communicates fluid from one of the first ports 505 defined by the outer surface 512. The example porting flow paths 504 can provide flow enhancement by communicating fluid with a respective volume, an inlet or outlet of a housing, or in another manner. As shown in FIG. 5, the axial passage 502 is a through port that extends from the top surface 514A to the bottom surface 514B along the axial direction. The axial passage 502 communicates fluid between a second port 507A on the top surface 514A and a third port 507B on the bottom surface 514B.

In some instances, the first ports 505 defined by the outer surface 512 may reside on the outward-facing teeth 508 or between neighboring pairs of the outward-facing teeth 508. Similarly, the axial passage 502 may reside in the body of the outward-facing teeth 508 or between neighboring pairs of the outward-facing teeth 508. In some implementations, each of the porting flow paths 504 is fluidically coupled to a respective axial passage 502. A pair of a fluidically-coupled porting flow paths 504 and an axial passage 502 may provide flow between the first port 505 and the second and third ports 507A, 507B.

As shown in FIG. 5, the example porting flow paths 504 and the axial passages 502 reside on the outward-facing teeth 508. In certain instances, the first ports 505 on the outer surface 512 may reside between a pair of neighboring outward-facing teeth 508 and the axial passages 502 reside in the body of the outward-facing teeth 508. In certain examples, the first ports 505 on the outer surface 512 may reside on the outward-facing teeth 508 and the axial passages 502 may reside between a pair of neighboring outward-facing teeth 508. In some instances, the porting flow paths 504 may extend in the body of the gear 500 or on the outer surface 512 to fluidically couple to the respective axial passages 502.

Figure 6:
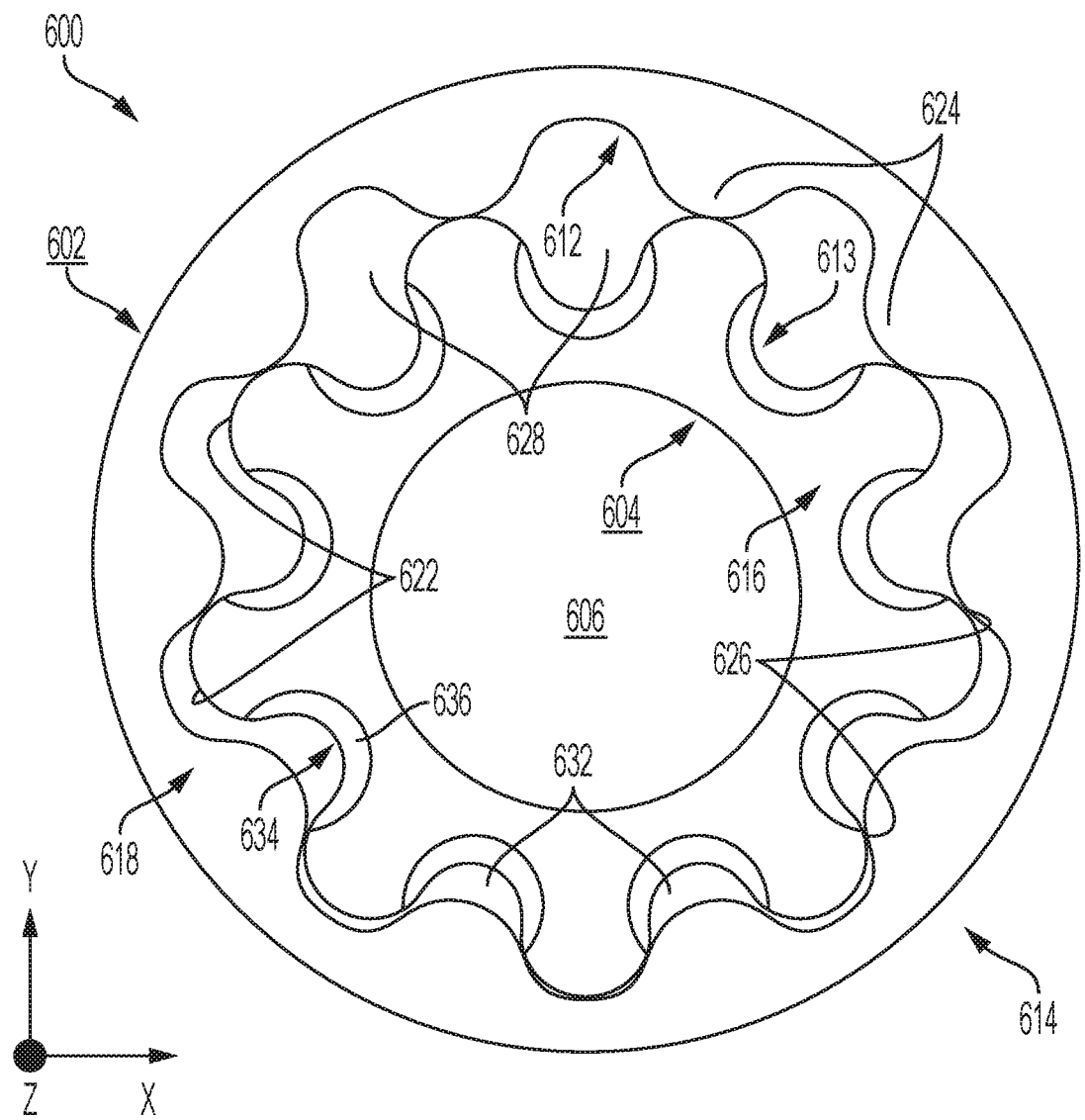
FIG. 6 is a side view of example inner and outer gears.

FIG. 6 is a side view of example inner and outer gears of a gerotor apparatus. The inner gear 604 resides in a central opening of the outer gear 602. The inner gear 604 has a central opening 606 that receives a shaft (e.g., the shaft 110 shown in FIG. 1). The outer and inner gears 602, 604 may be housed in a housing or another type of structure (not shown in FIG. 6). In some instances, the housing may include a flow chamber and two or more ports, e.g., an inlet and an outlet, to communicate fluid into and out of the flow chamber. The gerotor apparatus may include additional or different components, and the components may be arranged as shown or in another manner.

In some instances, the inner gear 604 is a driver gear and the outer gear 602 is a driven gear. For example, the inner gear 604 and the outer gear 602 may be operated similar to the inner gear 204 and the outer gear 202 shown in FIG. 2A. As shown in FIG. 6, the outer gear 602 has two parallel side surfaces, e.g., a top surface 618 and a bottom surface that may form seal contacts with the housing. Similarly, the inner gear 604 has two parallel side surfaces, e.g., a top surface 616 and a bottom surface that may form seal contacts with the housing. The outer gear 602 includes an outer surface 614 that can mate with an inner surface of a housing of a gerotor apparatus. The outer gear 602 further includes an inner surface 612 that mates with an outer surface 613 of the inner gear 604. The outer surface 613 of the inner gear 604 and the inner surface 612 of the outer gear 602 are designed to operably engage each other (e.g., seal against one another) to rotate together while contacting each other at varying contact points to define varying fluid volumes between the gears. As shown in FIG. 6, the inner surface 612 of the outer gear 602 has a first profile and the outer surface 613 of the inner gear 604 has a second, distinct profile that does not mesh precisely with the first profile.

As shown in FIG. 6, the example apparatus 600 includes multiple volumes 628 between the inner gear 604 and the outer gear 602. In some instances, the volumes 628 are defined by the inner surface 612 of the outer gear 602 and the outer surface 613 of the inner gear 604 between the contact points. In some implementations, each of the volumes 628 changes with the rotation of the outer and inner gears 602, 604. In some implementations, the inner surface 612 of the outer gear 602 and the outer surface 613 of the inner gear 604 are always in sliding contact at multiple distinct points to form nominal line seals 626. In some instances, each of the volumes 628 may be isolated from neighboring volumes 628 by the nominal line seals 626.

As shown in FIG. 6, the inner gear 604 includes multiple cutouts 632 defined by the outer surface 613 of the inner gear 604. In some instances, the outer and inner gears 602, 604 do not mesh precisely at the cutouts 632. In some instances, the multiple cutouts 632 are formed in regions between a pair of neighboring outward-facing teeth 622 on the outer surface 613 of the inner gear 604. In the example shown in FIG. 6, the cutouts 632 include a transitional edge 636 at the intersection of the top surface 616 and the outer surface 634. In some cases, the transitional edges 636 may be created by removing sharp edges between the two surfaces, for example, by chamfering, filleting or in another manner. In some instances, the transitional edges 632 may be straight, sloped, angled, rounded or in another profile. In some instances, the transitional edges 636 may similar to the chamfered edge 442, radiused edge 444 or the breakout cut 446 shown in FIG. 4D or in another manner.

In some aspects of operation, working fluid in the cutouts 632 may not be fully discharged through the outlet of the housing due to the mismatching profiles of the inner surface 612 of the outer gear 602 and the outer surface 613 of the inner gear 604 at the cutouts 632. The working fluid in the cutouts 632 can be returned to the inlet with the rotating gears 602, 604. In some instances, the cutouts 632 can enhance fluid flow within the gerotor apparatus by communicating fluid within the volumes 628 during the entire pumping cycle.

Figure 7:
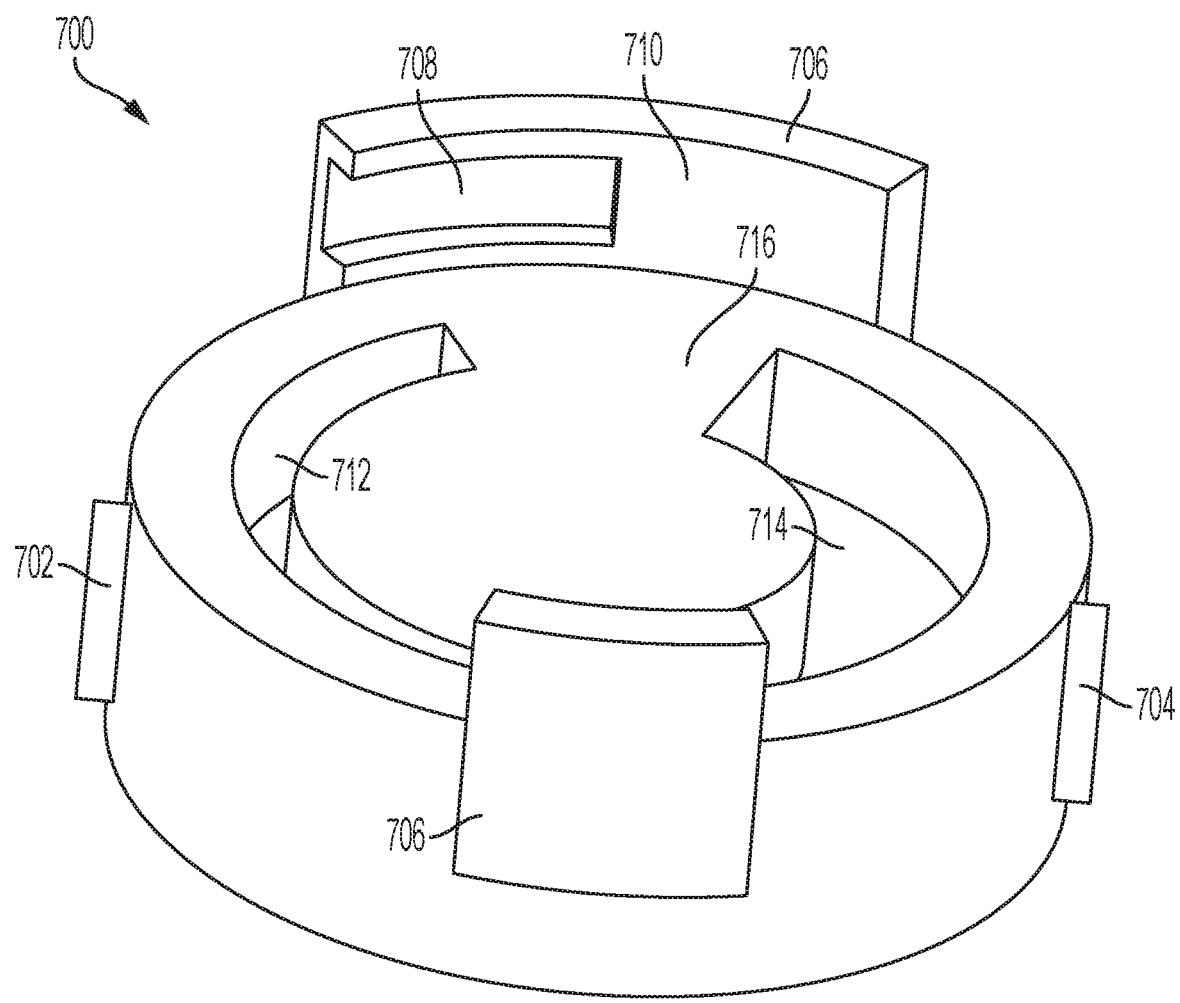
FIG. 7 is a perspective view of an example housing.

FIG. 7 is a perspective view of an example housing 700. In some instances, the housing 700 may be deployed as the housing of a gerotor apparatus. For example, the housing 700 may be used as the housing 206 shown in FIG. 2A, to house the gears of a gerotor apparatus. As shown in FIG. 7, the housing 700 includes a fluid input 702 and a fluid output 704. In some examples, the example housing 700 may include additional or different components, and the components may be arranged as shown or in another manner. For instance, the housing 700 may also include a cover.

As shown in FIG. 7, the housing 700 includes a fluid input 702 and a fluid output 704, which may be fluidically coupled with conduits, e.g., the conduits 114 shown in FIG. 1. The housing 700 further includes an inlet 712 and an outlet 714 defined by an inner planar surface 716. In certain examples, the gears of the gerotor apparatus may reside on the inner planar surface 716, between two side units 706, and enclosed by the cover of the housing 700. In some instances, the inner planar surface 716 makes seal contacts with bottom surfaces of the gears to prevent leakage from the inlet 712 to the outlet 714. In some instances, the housing 700 define portions of inlet and outlet regions. In some instances, the cover may include a sleeve to provide mechanical support to a shaft to drive the inner gear.

In some instances, the inlet 712 is fluidically coupled to the fluid input 702 to guide fluid to the flow chamber where the gears reside. In some instances, the outlet 714 is fluidically coupled to the fluid output 704 to guide the fluid out of the fluid chambers where the gears reside. The inlet 712 and outlet 714, which are spaced apart, are defined through the inner planar surface 716 and may be shaped to control fluid flow characteristics. In some instances, the inlet 712 and the outlet 714 may be also shaped according the outer and inner gears, flow-enhancing features of the outer and inner gears, or in another manner.

In some instances, each of the side units 706 includes an inner surface 710. In some instances, the inner surface 710 makes a seal contact with an outer surface of the outer gear (e.g., the outer surfaces 406A, 406B, 406C, 406D in FIGS. 4A, 4B, 4C, 4D, 4E) to prevent leakage from the inlet 712 and the outlet 714. In some instances, the housing 700 includes a cutout 708 defined by the inner surface 710 of the two side units 706. In some implementations, the cutout 708 may align with features of the outer gear (e.g., the porting flow paths 212, 402, 422A, 422B, 452 as shown in FIGS. 2A, 2B, 4A, 4B and 4E) to enhance fluid flow by enabling fluid communication during the entire pumping cycle.

Figure 8:
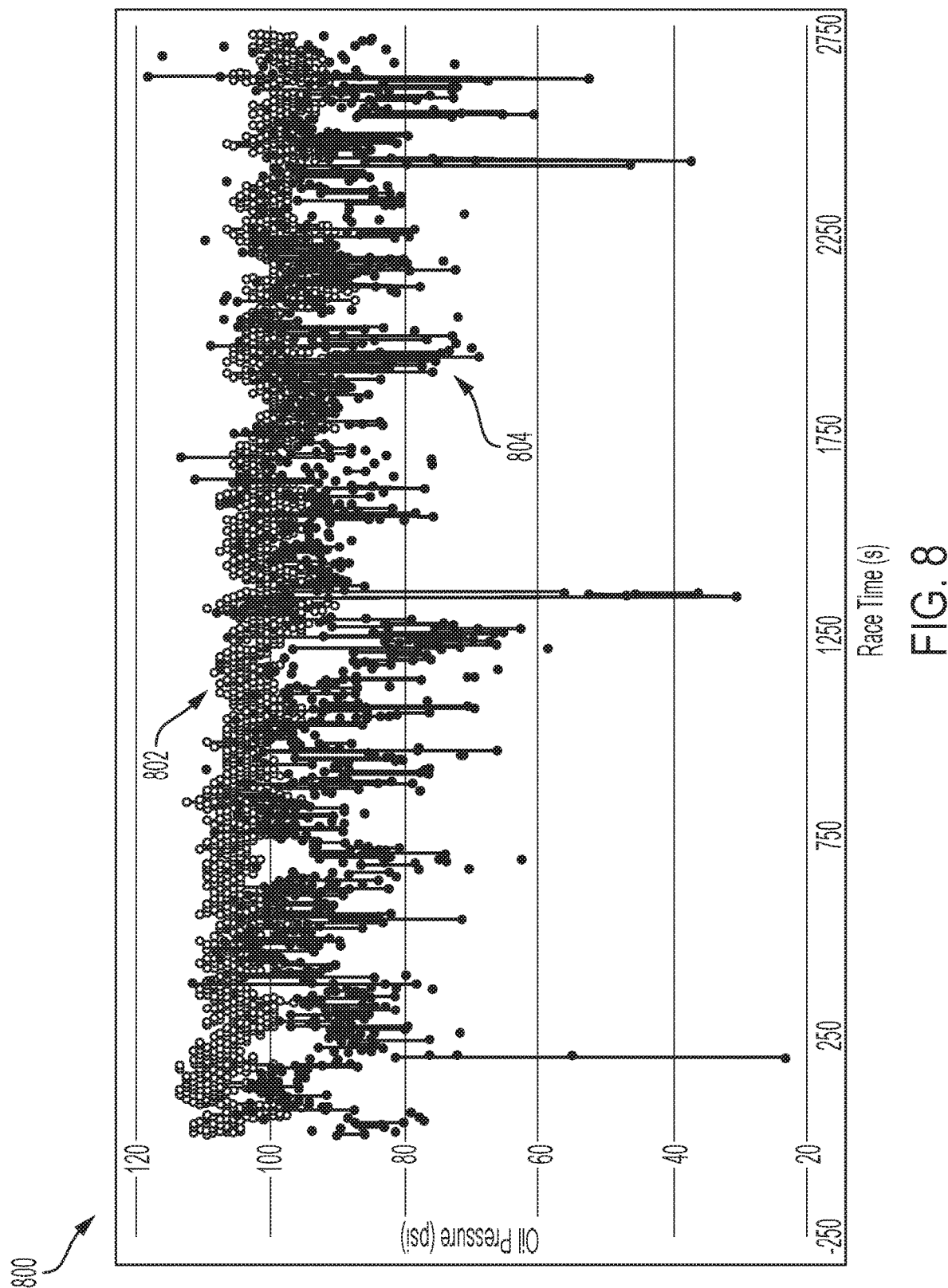
FIG. 8 is a plot showing a comparison of example pumping performances of two gerotors.

FIG. 8 is a plot 800 showing a comparison of example pumping performances of two example gerotors. Each of the two example gerotors includes an inner gear and an outer gear. The first gerotor has porting flow paths in the outer gear (e.g., as shown in FIG. 4A), while the other gerotor is a conventional gerotor that does not include any flow-enhancing features (no porting flow paths, no cutouts, etc.). To obtain the data shown in FIG. 8, the two gerotors were installed on a vehicle and the pumping performances of the two gerotors used as oil pumps were characterized. The two gerotors are coupled to the same unmodified relief valve system. Pressure values as a function of time at outlets of the two gerotors were measured using a pressure sensor configured at the same position. Further, the pumping performances of the two gerotors were characterized at the same oil temperature and rotational speed limit (RPM).

As shown in FIG. 8, a first pressure-time curve 802 (represented by open circles in the plot 800) obtained by operation of the first gerotor with flow-enhancement features exhibits a smooth pressure response as a function of time with pressure values in a range of 90-110 psi during the time period of 2750 seconds. A second pressure-time curve 804 (represented by filled circles in the plot 800) obtained by operation of the second, conventional gerotor shows a noisy pressure response as a function of time with pressure values fluctuating in a range of 20-120 psi during the same time period. As shown, the pressure response obtained on the second gerotor shows significantly higher irregularities. For example, the pressure values drop to values below 40 psi at a time of 200, 1300 and 2500 seconds. The flow-enhancement cutouts in the first gerotor can remove the irregularities and can significantly reduce pressure drop.

In a general aspect, fluid flow in a gerotor system is enhanced. In some examples, one or more gears of the gerotor system may include features (e.g., cutouts, ports, etc.) that enhance the flow of fluid through the gerotor system during its operation.

In a first example, a gerotor apparatus includes an outer gear and an inner gear. The outer gear includes inward-facing teeth and an inner surface that defines an inner profile of the outer gear. The inner profile of the outer gear includes respective profiles of the inward-facing teeth. The inner gear resides within the outer gear. The inner gear includes outward-facing teeth and an outer surface that defines an outer profile of the inner gear. The outer profile of the inner gear includes respective profiles of the outward-facing teeth. The inner gear and the outer gear reside in contact such that the inner profile of the outer gear seals against the outer profile of the inner gear at multiple distinct points. A cutout is defined by the inner surface of the outer gear between a neighboring pair of the inward-facing teeth, or by the outer surface of the inner gear between a neighboring pair of the outward-facing teeth.

Implementations of the first example may include one or more of the following features. The outer gear includes a first port defined by the inner surface of the outer gear. The outer gear includes an outer surface that defines an outer profile of the outer gear. The outer gear includes a second port defined by the outer surface of the outer gear. The outer gear includes a porting flow path through the outer gear between the first and second ports.

Implementations of the first example may include one or more of the following features. The outer gear includes parallel first and second planar side surfaces, and the porting flow path includes through porting defined by a cutout in the first planar side surface. The outer gear includes parallel first and second planar side surfaces, and the porting flow path includes radial porting defined by an interior surface of the outer gear between the first and second planar side surfaces.

Implementations of the first example may include one or more of the following features. The cutout includes a cutout at the edge of the inner surface of the outer gear, for example, the edge where the inner surface meets one of the planar side surfaces of the outer gear. The cutout includes a cutout at the edge of the outer surface of the inner gear, for example, the edge where the outer surface meets one of the planar side surfaces of the outer gear. The cutout includes a radiused edge at an edge of the inner surface of the outer gear. The cutout includes a chamfered edge at an edge of the inner surface of the outer gear. A first cutout is defined by the inner surface of the outer gear between a neighboring pair of the inward-facing teeth, and a second cutout is defined by the outer surface of the inner gear between a neighboring pair of the outward-facing teeth.

Implementations of the first example may include one or more of the following features. The outer gear includes a first port defined by the inner surface of the outer gear. The outer gear includes parallel first and second planar side surfaces. The outer gear includes a second port defined by the second planar side surface of the outer gear. The outer gear includes a porting flow path through the outer gear between the first and second ports.

Implementations of the first example may include one or more of the following features. The gerotor apparatus includes a housing that houses the inner gear and the outer gear in a flow chamber. The housing includes a cutout defined by an inner surface of the housing. The gerotor apparatus includes a first plurality of cutouts defined by the inner surface of the outer gear between each neighboring pair of the inward-facing teeth. The gerotor apparatus includes a second plurality of cutouts defined by the outer surface of the inner gear between each neighboring pair of the outward-facing teeth.

In a second example, fluid flow is driven from an inlet to an outlet by operation of a gerotor apparatus that includes an inner gear and an outer gear. The fluid flow is driven by rotating at least one of the inner gear and the outer gear (i.e., by rotating the inner gear, the outer gear, or both). The outer gear includes inward-facing teeth and an inner surface that defines an inner profile of the outer gear. The inner profile of the outer gear includes respective profiles of the inward-facing teeth. The inner gear resides within the outer gear. The inner gear includes outward-facing teeth and an outer surface that defines an outer profile of the inner gear. The outer profile of the inner gear includes respective profiles of the outward-facing teeth. The inner gear and the outer gear reside in contact such that the inner profile of the outer gear seals against the outer profile of the inner gear at multiple distinct points. The fluid flow through the gerotor apparatus is enhanced by communicating fluid along a cutout. The cutout is defined by the inner surface of the outer gear between a neighboring pair of the inward-facing teeth, or by the outer surface of the inner gear between a neighboring pair of the outward-facing teeth.

Implementations of the second example may include one or more of the following features. The cutout is defined by the inner surface of the outer gear. The cutout is defined by the outer surface of the inner gear. The fluid flow is further enhanced by communicating fluid through a porting flow path in the outer gear. The cutout includes a cutout at the edge of the inner surface of the outer gear, for example, the edge where the inner surface meets one of the planar side surfaces of the outer gear. The cutout includes a cutout at the edge of the outer surface of the inner gear, for example, the edge where the outer surface meets one of the planar side surfaces of the outer gear. The cutout includes at least one of a radiused edge of the inner surface of the outer gear or a chamfered edge of the inner surface of the outer gear.

Implementations of the second example may include one or more of the following features. The enhanced fluid flow improves operation of the gerotor apparatus. The gerotor apparatus communicates the working fluid to a target device, and the enhanced fluid flow may also improve operation of the target device.

In a third example, a gear of a gerotor apparatus includes inward-facing teeth, an inner surface, and a cutout. The inner surface defines an inner profile of the gear. The inner profile of the gear includes respective profiles of the inward-facing teeth. The gear is configured to reside in contact with another gear such that the inner profile of the gear seals against an outer profile of the other gear at multiple distinct contact points. The cutout is defined by the inner surface of the outer gear between a neighboring pair of the inward-facing teeth.

Implementations of the third example may include one or more of the following features. The gear further includes a first port defined by the inner surface of the gear, an outer surface that defines an outer profile of the gear; a second port defined by the outer surface of the gear; and a porting flow path through the gear between the first and second ports. The cutout includes at least one of a radiused edge or a chamfered edge.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple implementations separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A gerotor apparatus for a pump in a vehicle system, comprising:
   an outer rotor comprising:
      inward-facing teeth,
      an inner surface that defines an inner profile of the outer rotor, the inner profile of the outer rotor comprising respective profiles of the inward-facing teeth, and
   a through passage through the outer rotor, the through passage defined by:
      a first port formed at the inner surface of the outer rotor between a neighboring pair of the inward-facing teeth, a second port formed at a planar side surface of the outer rotor, a porting flow path extending from the first port, and an axial flow passage extending from the second port to communicate with the extended porting flow path so that fluid flowing in the through passage enters the first port and then flows through the porting flow path and subsequently through the axial flow passage and exits the outer rotor after flowing through the second port; and an inner rotor residing within the outer rotor and comprising:

outward-facing teeth, an outer surface that defines an outer profile of the inner rotor, the outer profile of the inner rotor comprising respective profiles of the outward-facing teeth, a cutout defined by the outer surface of the inner rotor, parallel first and second planar side surfaces, ports defined by the outer surface of the inner rotor, and one or more flow paths through the inner rotor between the respective ports, wherein the inner rotor and the outer rotor reside in contact such that the inner profile of the outer rotor seals against the outer profile of the inner rotor at multiple distinct points.

2. The gerotor apparatus of claim 1, wherein the outer rotor comprises a radiused edge.

3. The gerotor apparatus of claim 1, wherein the outer rotor comprises a chamfered edge.

4. The gerotor apparatus of claim 1, comprising a housing that houses the inner rotor and the outer rotor in a flow chamber, and the inner rotor and the outer rotor are configured to rotate in the flow chamber of the housing during operation of the pump.

5. The gerotor apparatus of claim 4, wherein the housing comprises a cutout defined by an inner surface of the housing.

6. A gerotor apparatus for a pump in a vehicle system, comprising:

an outer rotor comprising:

inward-facing teeth, an inner surface that defines an inner profile of the outer rotor, the inner profile of the outer rotor comprising respective profiles of the inward-facing teeth, and a through passage through the outer rotor, the through passage defined by:

a first port formed at the inner surface of the outer rotor between a neighboring pair of the inward-facing teeth, a second port formed at a planar side surface of the outer rotor, a porting flow path extending from the first port, and an axial flow passage extending from the second port to communicate with the extended porting flow path so that fluid flowing in the through passage enters the first port and then flows through the porting flow path and subsequently through the axial flow passage and exits the outer rotor after flowing through the second port, wherein the inner surface of the outer rotor defines a first plurality of cutouts, each of the first plurality of cutouts defined between a respective neighboring pair of the inward-facing teeth; and an inner rotor residing within the outer rotor and comprising:

outward-facing teeth, and an outer surface that defines an outer profile of the inner rotor, the outer profile of the inner rotor comprising respective profiles of the outward-facing teeth, wherein the outer surface of the inner rotor defines a second plurality of cutouts, each of the second plurality of cutouts defined between a respective neighboring pair of the outward-facing teeth;

wherein the inner rotor and the outer rotor reside in contact such that the inner profile of the outer rotor seals against the outer profile of the inner rotor at multiple distinct points.

7. The gerotor apparatus of claim 6, wherein the outer rotor comprises a radiused edge.

8. The gerotor apparatus of claim 6, wherein the outer rotor comprises a chamfered edge.

9. The gerotor apparatus of claim 6, comprising a housing that houses the inner rotor and the outer rotor in a flow chamber, and the inner rotor and the outer rotor are configured to rotate in the flow chamber of the housing during operation of the pump.

10. The gerotor apparatus of claim 9, wherein the housing comprises a cutout defined by an inner surface of the housing.

* * * * *